(12) United States Patent
McAlpin et al.

(10) Patent No.: US 11,965,081 B2
(45) Date of Patent: Apr. 23, 2024

(54) COMPOSITION FOR ODOR SUPPRESSION (71) Applicant: Dow Global Technologies LLC, Midland, MI (US)

(72) Inventors: Casey R. McAlpin, Lake Jackson, TX (US); Arkady L. Krasovskiy, Lake Jackson, TX (US); Kefu Sun, Lake Jackson, TX (US); Scott T. Matteucci, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 139 days.

(21) Appl. No.: 17/434,198

(22) PCT Filed: Feb. 18, 2020

(86) PCT No.: PCT/US2020/018620
§ 371 (c)(1),
(2) Date: Aug. 26, 2021

(87) PCT Pub. No.: WO2020/176290
PCT Pub. Date: Sep. 3, 2020

(65) Prior Publication Data
US 2022/0169839 A1 Jun. 2, 2022

Related U.S. Application Data

(60) Provisional application No. 62/811,351, filed on Feb. 27, 2019.

(51) Int. Cl.
*C08L 23/04* (2006.01)
*C08K 3/22* (2006.01)

(52) U.S. Cl.
CPC ...... *C08L 23/04* (2013.01); *C08K 2003/2206* (2013.01); *C08K 2003/2217* (2013.01); *C08L 2203/16* (2013.01)

(58) Field of Classification Search
CPC ............ C08L 23/04; C08K 2003/2206; C08K 2003/2217
See application file for complete search history.

(56) References Cited

U.S. PATENT DOCUMENTS

| | | | |
|---|---|---|---|
| 3,265,649 | A | 8/1966 | Volkert et al. |
| 4,591,633 | A | 5/1986 | Suzuki et al. |
| 4,680,380 | A | 7/1987 | Benedikt et al. |
| 5,001,176 | A | 3/1991 | Nakazima |
| 5,066,686 | A | 11/1991 | Fodor et al. |

(Continued)

FOREIGN PATENT DOCUMENTS

| | | |
|---|---|---|
| CN | 102030945 A | 4/2011 |
| CN | 103374180 A | 10/2013 |
| JP | 2003277627 A | 10/2003 |

*Primary Examiner* — Catherine S Branch
*Assistant Examiner* — Huihong Qiao
(74) *Attorney, Agent, or Firm* — Boyle Fredrickson, S.C.

(57) ABSTRACT

The present disclosure provides a composition. In an embodiment, the composition includes an olefin-based polymer and from 0.15 wt % to 15 wt % of an odor suppressant. The odor suppressant includes (i) from 0.05 wt % to 2 wt % of a metal oxide having a band gap greater than 5.0 electron volts (eV), and (ii) from 0.1 wt % to 13 wt % of an acid copolymer. The ratio of metal oxide to acid copolymer is from 1:20 to 1:1. Weight percents are based on the total weight of the composition.

14 Claims, 1 Drawing Sheet

(56) References Cited

U.S. PATENT DOCUMENTS

| | | | |
|---|---|---|---|
| 5,100,930 A | | 3/1992 | Fukui et al. |
| 5,161,686 A | * | 11/1992 | Weber .................... A61B 17/06 |
| | | | 206/440 |
| 5,436,282 A | | 7/1995 | Gustafsson et al. |
| 5,677,383 A | | 10/1997 | Chum et al. |
| 6,111,023 A | | 8/2000 | Chum et al. |
| 6,391,407 B1 | | 5/2002 | Kashiba et al. |
| 6,689,483 B1 | * | 2/2004 | Hoh .......................... C08F 6/10 |
| | | | 428/522 |
| 6,984,695 B2 | | 1/2006 | Brown et al. |
| 7,972,532 B2 | | 7/2011 | Simpson et al. |
| 2003/0078552 A1 | | 4/2003 | Tepper et al. |
| 2005/0063928 A1 | | 3/2005 | Withiam et al. |
| 2005/0287318 A1 | | 12/2005 | Speer et al. |
| 2006/0008442 A1 | | 1/2006 | MacDonald et al. |
| 2007/0210281 A1 | | 9/2007 | Speer et al. |
| 2008/0193704 A1 | * | 8/2008 | Ogawa .................... H01L 51/50 |
| | | | 428/76 |
| 2009/0098016 A1 | | 4/2009 | Koper et al. |
| 2010/0300905 A1 | | 12/2010 | Speer et al. |
| 2012/0100093 A1 | | 4/2012 | Nonomura |
| 2013/0164467 A1 | | 6/2013 | Speer et al. |

\* cited by examiner

COMPOSITION FOR ODOR SUPPRESSION

BACKGROUND

Many uses of articles made from olefin-based polymer encounter the nuisance of foul odor. Common sources of offending odor include volatile hetero-carbonyl species. Many applications exist where it is desirable for an olefin-based polymer article to be able to remove, or otherwise to suppress, odor. As such, numerous industries desire materials that can remove volatile hetero-carbonyl species from the surrounding gas phase, or prevent the volatiles from partitioning out of the polyolefin matrix.

Metal oxides, such as calcium oxide (CaO), are known to consume many odor-generating molecules. All other factors being equal, it is known that CaO concentration and odor suppression are directly related—i.e., as CaO concentration increases in a given olefin-based polymer article, the effectiveness of odor suppression also increases. Likewise, it is known that as the relative surface area of a sorbent system increases so does its' activity and capacity.

Although odor suppression increases as CaO increases, limits do exist for the amount of CaO that can be effectively incorporated into olefin-based polymer articles. In the production of blown films for example, high loading of CaO particles increases extrusion die lip buildup, thereby causing film defects. High loading of CaO particles also increases haze resulting in degradation of olefin-based polymer film transparency and/or degradation in film color. High loading of CaO particles also deleteriously impacts mechanical properties such as impact strength and film tear strength. Processing parameters and end-use mechanical requirements thereby impose practical limits to the load of CaO particles into olefin-based polymer compositions.

A need therefore exists for olefin-based polymer compositions with improved odor suppression capabilities while simultaneously carrying suitable calcium oxide load in order to maintain processability, desired optics, and desired mechanical properties for end-use applications. A need further exists for odor-suppressing articles made from such olefin-based polymer compositions.

SUMMARY

The present disclosure provides a composition. In an embodiment, the composition includes an olefin-based polymer and from 0.15 wt % to 15 wt % of an odor suppressant. The odor suppressant includes (i) from 0.05 wt % to 2 wt % of a metal oxide having a band gap greater than 5.0 electron volts (eV), and (ii) from 0.1 wt % to 13 wt % of an acid copolymer. The ratio of metal oxide to acid copolymer is from 1:20 to 1:1. Weight percents are based on the total weight of the composition.

The present disclosure provides a process. In an embodiment, the process includes providing an olefin-based polymer. The olefin-based polymer has an amount of at least one volatile carbonyl-containing species. The process includes adding to the olefin-based polymer from 0.15 wt % to 15 wt % of an odor suppressant. The odor suppressant includes (i) from 0.05 wt % to 2 wt % of a metal oxide having a band gap greater than 5.0 electron volts (eV); and (ii) from 0.1 wt % to 13 wt % of an acid copolymer. The ratio of metal oxide to acid copolymer is from 1:20 to 1:1. The process includes neutralizing, with the odor suppressant, at least some of the volatile hetero-carbonyl species in the olefin-based polymer to form an odor-reduced composition. Weight percents are based on total weight of the odor-reduced composition.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent U.S. version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., 1 or 2, or 3 to 5, or 6, or 7), any subrange between any two explicit values is included (e.g., 1 to 2; 2 to 6; 5 to 7; 3 to 7; 5 to 6; etc.).

Unless stated to the contrary, implicit from the context, or customary in the art, all parts and percentages are based on weight and all test methods are current as of the filing date of this disclosure.

The terms "blend" or "polymer blend," as used herein, is a blend of two or more polymers. Such a blend may or may not be miscible (phase separated). Such a blend may or may not be phase separated. Such a blend may or may not contain one or more domain configurations, as determined from transmission electron spectroscopy, light scattering, x-ray scattering, and other methods known in the art.

The term "composition" refers to a mixture of materials which comprise the composition, as well as reaction products and decomposition products formed from the materials of the composition.

The terms "comprising," "including," "having" and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "ethylene-based polymer" is a polymer that contains more than 50 weight percent (wt %) polymerized ethylene monomer (based on the total amount of polymerizable monomers) and, optionally, may contain at least one comonomer. Ethylene-based polymer includes ethylene homopolymer, and ethylene copolymer (meaning units derived from ethylene and one or more comonomers). The terms "ethylene-based polymer" and "polyethylene" may be used interchangeably. Nonlimiting examples of ethylene-based polymer (polyethylene) include low density polyethylene (LDPE) and linear polyethylene. Nonlimiting examples of linear polyethylene include linear low density polyethylene (LLDPE), ultra low density polyethylene (ULDPE), very low density polyethylene (VLDPE), multi-component ethylene-based copolymer (EPE), ethylene/α- olefin multi-block copolymers (also known as olefin block copolymer (OBC)), substantially linear, or linear, plastomers/elastomers, and high density polyethylene (HDPE). Generally, polyethylene may be produced in gas-phase, fluidized bed reactors, liquid phase slurry process reactors, or liquid phase solution process reactors, using a heterogeneous catalyst system, such as Ziegler-Natta catalyst, a homogeneous catalyst system, comprising Group 4 transition metals and ligand structures such as metallocene, non-metallocene metal-centered, heteroaryl, heterovalent aryloxyether, phosphinimine, and others. Combinations of heterogeneous and/or homogeneous catalysts also may be used in either single reactor or dual reactor configurations.

"Ethylene plastomers/elastomers" are substantially linear, or linear, ethylene/α-olefin copolymers containing homogeneous short-chain branching distribution comprising units derived from ethylene and units derived from at least one $C_3$-$C_{10}$ α-olefin comonomer. Ethylene plastomers/elastomers have a density from 0.870 g/cc to 0.917 g/cc. Nonlimiting examples of ethylene plastomers/elastomers include AFFINITY™ plastomers and elastomers (available from The Dow Chemical Company), EXACT™ Plastomers (available from ExxonMobil Chemical), Tafmer™ (available from Mitsui), Nexlene™ (available from SK Chemicals Co.), and Lucene™ (available LG Chem Ltd.).

"High density polyethylene" (or "HDPE") is an ethylene homopolymer or an ethylene/α-olefin copolymer with at least one $C_4$-$C_{10}$ α-olefin comonomer, or $C_4$-$C_8$ α-olefin comonomer and a density from 0.940 g/cc, or 0.945 g/cc, or 0.950 g/cc, or 0.953 g/cc to 0.955 g/cc, or 0.960 g/cc, or 0.965 g/cc, or 0.970 g/cc, or 0.975 g/cc, or 0.980 g/cc. The HDPE can be a monomodal copolymer or a multimodal copolymer. A "monomodal ethylene copolymer" is an ethylene/$C_4$-$C_{10}$ α-olefin copolymer that has one distinct peak in a gel permeation chromatography (GPC) showing the molecular weight distribution. A "multimodal ethylene copolymer" is an ethylene/$C_4$-$C_{10}$ α-olefin copolymer that has at least two distinct peaks in a GPC showing the molecular weight distribution. Multimodal includes copolymer having two peaks (bimodal) as well as copolymer having more than two peaks. Nonlimiting examples of HDPE include DOW™ High Density Polyethylene (HDPE) Resins (available from The Dow Chemical Company), ELITE™ Enhanced Polyethylene Resins (available from The Dow Chemical Company), CONTINUUM™ Bimodal Polyethylene Resins (available from The Dow Chemical Company), LUPOLEN™ (available from LyondellBasell), as well as HDPE products from Borealis, Ineos, and ExxonMobil.

An "interpolymer" is a polymer prepared by the polymerization of at least two different monomers. This generic term includes copolymers, usually employed to refer to polymers prepared from two different monomers, and polymers prepared from more than two different monomers, e.g., terpolymers, tetrapolymers, etc.

"Linear low density polyethylene" (or "LLDPE") is a linear ethylene/α-olefin copolymer containing heterogeneous short-chain branching distribution comprising units derived from ethylene and units derived from at least one $C_3$-$C_{10}$ α-olefin, or $C_4$-$C_8$ α-olefin, comonomer. LLDPE is characterized by little, if any, long chain branching, in contrast to conventional LDPE. LLDPE has a density from 0.910 g/cc to less than 0.940 g/cc. Nonlimiting examples of LLDPE include TUFLIN™ linear low density polyethylene resins (available from The Dow Chemical Company), DOWLEX™ polyethylene resins (available from the Dow Chemical Company), and MARLEX™ polyethylene (available from Chevron Phillips).

"Low density polyethylene" (or "LDPE") consists of ethylene homopolymer, or ethylene/α-olefin copolymer comprising at least one $C_3$-$C_{10}$ α-olefin, or $C_4$-$C_8$ α-olefin, that has a density from 0.915 g/cc to less than 0.940 g/cc and contains long chain branching with broad MWD. LDPE is typically produced by way of high pressure free radical polymerization (tubular reactor or autoclave with free radical initiator). Nonlimiting examples of LDPE include MarFlex™ (Chevron Phillips), LUPOLEN™ (LyondellBasell), as well as LDPE products from Borealis, Ineos, ExxonMobil, and others.

"Multi-component ethylene-based copolymer" (or "EPE") comprises units derived from ethylene and units derived from at least one $C_3$-$C_{10}$ α-olefin, or $C_4$-$C_8$ α-olefin, comonomer, such as described in patent references U.S. Pat. Nos. 6,111,023; 5,677,383; and 6,984,695. EPE resins have a density from 0.905 g/cc to 0.962 g/cc. Nonlimiting examples of EPE resins include ELITE™ enhanced polyethylene (available from The Dow Chemical Company), ELITE AT™ advanced technology resins (available from The Dow Chemical Company), SURPASS™ Polyethylene (PE) Resins (available from Nova Chemicals), and SMART™ (available from SK Chemicals Co.).

An "olefin-based polymer" or "polyolefin" is a polymer that contains more than 50 weight percent polymerized olefin monomer (based on total amount of polymerizable monomers), and optionally, may contain at least one comonomer. Nonlimiting examples of an olefin-based polymer include ethylene-based polymer or propylene-based polymer.

A "polymer" is a compound prepared by polymerizing monomers, whether of the same or a different type, that in polymerized form provide the multiple and/or repeating "units" or "mer units" that make up a polymer. The generic term polymer thus embraces the term homopolymer, usually employed to refer to polymers prepared from only one type of monomer, and the term copolymer, usually employed to refer to polymers prepared from at least two types of monomers. It also embraces all forms of copolymer, e.g., random, block, etc. The terms "ethylene/α-olefin polymer" and "propylene/α-olefin polymer" are indicative of copolymer as described above prepared from polymerizing ethylene or propylene respectively and one or more additional, polymerizable α-olefin monomer. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" may be used interchangeably. Nonlimiting examples of suitable propylene copolymer include propylene impact copolymer and propylene random copolymer.

"Ultra low density polyethylene" (or "ULDPE") and "very low density polyethylene" (or "VLDPE") each is a linear ethylene/α-olefin copolymer containing heterogeneous short-chain branching distribution comprising units derived from ethylene and units derived from at least one $C_3$-$C_{10}$ α-olefin comonomer. ULDPE and VLDPE each has a density from 0.885 g/cc to 0.915 g/cc. Nonlimiting examples of ULDPE and VLDPE include ATTANE™ ultra low density polyethylene resins (available from The Dow Chemical Company) and FLEXOMER™ very low density polyethylene resins (available from The Dow Chemical Company).

Test Methods

D10, D50, and D90 particle size is measured using a Coulter LS 230 Laser Light Scattering Particle Sizer, available from Coulter Corporation. D10 particle size is the particle diameter at which 10% of the powder's mass is composed of particles with a diameter less than this value. D50 particle size is the particle diameter at which 50% of the powder's mass is composed of particles with a diameter less than this value and 50% of the power's mass is composed of particles with a diameter greater than said value. D90 particle size is the particle diameter at which 90% of the powder's mass is composed of particles with a diameter less than this value. Mean volume average particle size is measured using a Coulter LS 230 Laser Light Scattering Particle Sizer, available from Coulter Corporation. Particle size distribution is calculated in accordance with Equation A:

$$\text{Particle size distribution} = \frac{(D90 - D10)}{D50}. \quad \text{Equation A}$$

Density is measured in accordance with ASTM D792, Method B. The result is recorded in grams per cubic centimeter (g/cc).

Differential Scanning Calorimetry (DSC). Differential Scanning Calorimetry (DSC) can be used to measure the melting, crystallization, and glass transition behavior of a polymer over a wide range of temperature. For example, the TA Instruments Q1000 DSC, equipped with an RCS (refrigerated cooling system) and an autosampler is used to perform this analysis. During testing, a nitrogen purge gas flow of 50 ml/min is used. Each sample is melt pressed into a thin film at about 175° C.; the melted sample is then air-cooled to room temperature (about 25° C.). A 3-10 mg, 6 mm diameter specimen is extracted from the cooled polymer, weighed, placed in a light aluminum pan (ca 50 mg), and crimped shut. Analysis is then performed to determine its thermal properties.

The thermal behavior of the sample is determined by ramping the sample temperature up and down to create a heat flow versus temperature profile. First, the sample is rapidly heated to 180° C. and held isothermal for 3 minutes in order to remove its thermal history. Next, the sample is cooled to −40° C. at a 10° C./minute cooling rate and held isothermal at −40° C. for 3 minutes. The sample is then heated to 180° C. (this is the "second heat" ramp) at a 10° C./minute heating rate. The cooling and second heating curves are recorded. The cool curve is analyzed by setting baseline endpoints from the beginning of crystallization to −20° C. The heat curve is analyzed by setting baseline endpoints from −20° C. to the end of melt. The values determined are extrapolated onset of melting, Tm, and extrapolated onset of crystallization, Tc. Heat of fusion ($H_f$) (in Joules pergram), and the calculated % crystallinity for polyethylene samples using the following Equation: % Crystallinity=(($H_f$)/292 J/g)×100. Glass transition temperature, Tg, is determined from the DSC heating curve where half the sample has gained the liquid heat capacity as described in Bernhard Wunderlich, *The Basis of Thermal Analysis, in Thermal Characterization of Polymeric Materials* 92, 278-279 (Edith A. Turi ed., 2d ed. 1997). Baselines are drawn from below and above the glass transition region and extrapolated through the Tg region. The temperature at which the sample heat capacity is half-way between these baselines is the Tg.

Melt flow rate (MFR) in g/10 min is measured in accordance with ASTM D1238 (230° C./2.16 kg).

Melt index (MI) (12) in g/10 min is measured in accordance with ASTM D1238 (190° C./2.16 kg).

Normalized gas chromatography for measuring odor reduction. Odor suppression is the ability of a composition to reduce, or otherwise to neutralize, the amount of volatile hetero-carbonyl species in a composition. Gas chromatography is used to compare (i) the amount of volatile hetero-carbonyl species in the headspace gas around a polyolefin sample with no odor suppressant (hereafter "neat polyolefin") to (ii) a headspace gas around a second sample with the same polyolefin as the neat polyolefin, the second sample also containing an amount of odor suppressant. The GC detected values for the headspace gas for the first sample, the neat polyolefin, are compared to the GC detected values for the headspace gas for the second sample, the polyolefin with odor suppressant, using Equation (1) below.

(GC(PO with odor suppressant at *t*)−GC(neat PO at *t*))/GC(neat PO at *t*)*100=% odor reduction   Equation (1)

wherein GC is the detected gas chromatography value for one or more pre-determined volatile hetero-carbonyl species;

PO is polyolefin; and t is a pre-determined time interval.

Equation (1) is hereafter interchangably referred to as "normalized gas chromatography."

Normalized gas chromatography is performed as follows. The percent odor reduction for propanal (i.e., a volatile hetero-carbonyl species) is measured with gas chromatography/mass spectroscopy (GC/MS).

An Agilent 7890A gas chromatograph (GC) is used with the following columns, where the column is a DB-1701, 30 m×0.32 mm ID×1 μm film thickness with helium as the carrier gas at a constant flow rate of 2.0 mL/min. The oven for the GC is programmed to hold at 50° C. for 3.5 min. The inlet split temperature is 150° C., with a split ratio of 10:1. The headspace gas injection volume is 1.0 mL, and is injected using a gas-tight syringe. The transfer line is held at 250° C.

The column outlet is connected to Mass Spectrometer and flame ionization detector (FID) in parallel through Agilent 2-Way non-Purged Splitter (part #G3181B). The mass spectrometer operated with the following conditions: Scan 14-200 m/z (EI), source temperature 230° C., quad temperature 150° C., EM voltage 2447 V, electron energy −70 eV, 2 samples, and a threshold of 0.

The FID is run under the following conditions: 250° C., 30 mL/min of hydrogen flow, 400 mL/min of air flow, and 45 mL helium/min makeup gas.

Samples are prepared by adding 2 grams of sample pellets to separate headspace vials. A 0.5 mL, 1700 parts per million by volume (ppmv) sample of propanal was added separately to each headspace vial. Samples are sealed for 20 hours (hrs) at room temperature, and shaken for 4 hours.

Headspace gas is withdrawn from the vials at pre-determined time intervals in order to evaluate odor suppression capability. A "percent odor reduction" value (or "% odor reduction") is calculated by (a) subtracting the test sample propanal concentration from the control propanal concentration (neat polyolefin) and then (b) dividing the remainder of (a) by the control propanal concentration using Equation (1) above.

DETAILED DESCRIPTION

The present disclosure provides a composition. In an embodiment, a composition for suppressing odors is provided and includes an olefin-based polymer and an odor suppressant. The composition includes from 0.15 wt % to 15 wt % of the odor suppressant based on total weight of the composition. The odor suppressant includes (i) from 0.05 wt % to 2 wt % based on total weight of the composition of a metal oxide having a band gap greater than 5.0 electron volts (eV). The odor suppressant further includes (ii) from 0.1 wt % to 13 wt % based on total weight of the composition of an acid copolymer. The ratio of metal oxide to acid copolymer is from 1:20 to 1:1.

A. Olefin-Based Polymer

The present composition includes an olefin-based polymer. The olefin-based polymer includes an amount of at least one volatile hetero-carbonyl species. It is understood the olefin-based polymer may contain two, three, four or more different volatile hetero-carbonyl species. In an embodiment, the olefin-based polymer is a propylene-based polymer, an ethylene-based polymer, or combinations thereof. Nonlimiting examples of propylene-based polymer include propylene copolymer, propylene homopolymer, and combinations thereof. In an embodiment, the propylene-based polymer is a propylene/α-olefin copolymer. Nonlimiting examples of suitable α-olefins include $C_2$ and $C_4$-$C_{20}$ α-olefins, or $C_4$-$C_{10}$ α-olefins, or $C_4$-$C_8$ α-olefins. Representative α-olefins include ethylene, 1-butene, 1-pentene, 1-hexene, 1-heptene and 1-octene.

In an embodiment, the propylene/α-olefin copolymer is a propylene/ethylene copolymer containing greater than 50 wt % units derived from propylene, or from 51 wt %, or 55 wt %, or 60 wt % to 70 wt %, or 80 wt %, or 90 wt %, or 95 wt %, or 99 wt % units derived from propylene, based on the weight of the propylene/ethylene copolymer. The propylene/ethylene copolymer contains a reciprocal amount of units derived from ethylene, or from less than 50 wt %, or 49 wt %, or 45 wt %, or 40 wt % to 30 wt %, or 20 wt %, or 10 wt %, or 5 wt %, or 1 wt %, or 0 wt % units derived from ethylene, based on the weight of the propylene/ethylene copolymer.

In an embodiment, the olefin-based polymer is an ethylene-based polymer. The ethylene-based polymer can be an ethylene homopolymer or an ethylene/α-olefin copolymer.

In an embodiment, the ethylene-based polymer is an ethylene/α-olefin copolymer. Nonlimiting examples of suitable α-olefins include $C_3$-$C_{20}$ α-olefins, or $C_4$-$C_{10}$ α-olefins, or $C_4$-$C_8$ α-olefins. Representative α-olefins include propylene, 1-butene, 1-pentene, 1-hexene, 1-heptene and 1-octene.

In an embodiment, the ethylene/α-olefin copolymer is an HDPE that is an ethylene/$C_4$-$C_8$ α-olefin copolymer. The HDPE has one, some, or all of the following properties:
  (i) a density from 0.940 g/cc to 0.960 g/cc; and/or
  (ii) a Tm from 128° C. to 132° C.; and/or
  (iii) a melt index from 0.5 g/10 min to 2.0 g/10 min.

A nonlimiting example of a suitable HDPE is DMDA-1250 available from The Dow Chemical Company.

In an embodiment, the ethylene/α-olefin copolymer is an LDPE having one, some, or all of the following properties:
  (i) a density from 0.910 to 0.920 g/cc; and/or
  (ii) a Tm from 105° C. to 110° C.; and/or
  (iii) a melt index from 5.0 g/10 min to 10.0 g/10 min.

A nonlimiting example of a suitable LDPE is LDPE 722 available from The Dow Chemical Company.

B. Odor Suppressant

The present composition includes an odor suppressant. The odor suppressant is a blend of metal oxide (Bi) and an acid copolymer (Bii).

B(i) Metal Oxide

The odor suppressant includes metal oxide. The metal oxide has a band gap greater than 5.0 electron volts (eV). A "band gap," as used herein, is an energy range in a solid where no electron states exist. The band gap is the energy required to promote a valence electron to a conduction electron, which is free to move within the crystal lattice and serve as a charge carrier to conduct electric current. An "electron volt" or "eV," is a unit of energy equal to approximately $1.6 \times 10^{-19}$ joules. Band gap for metal oxides are described in detail in *Surface and Nanomolecular Catalysis*, Ryan Richards (ed), Taylor & Francis 2006, the contents of which are incorporated by reference herein.

Bounded by no particular theory, it is believed that a large band gap (i.e., greater than 5.0 eV) translates to a bond with very little covalent character in which electrons are shared disproportionately. This may result in metal ions in the lattice with a net positive charge and oxide ions with a net negative charge. The magnitude of the charge can therefore be proportional to the band gap. The electron-starved metal ions may consequently be free to act as Lewis acids, accepting electrons from slightly basic moieties present in the volatile hetero-carbonyl odorant molecules. Additionally, the crystalline oxide ions may be able to act as Lewis bases donating electrons into slightly acidic moieties in the volatile hetero-carbonyl odorant molecules.

Table A below provides band gap values for several metal oxides from *Surface and Nanomolecular Catalysis*, Ryan Richards (ed), Taylor & Francis 2006.

TABLE A

| Band gap thresholds for some metal oxides | |
|---|---|
| Metal oxide | Band gap (eV) |
| MgO | 7.7 |
| CaO | 6.9 |
| SrO | 5.3 |
| BaO | 4.4 |
| ZnO | ~3.2 |
| $TiO_2$ | ~3.2 |
| $Al_2O_3$ | ~7 |
| CuO | 1.2 |
| $Cu_2O$ | 2.1 |

In an embodiment, the metal oxide is in the form of particles (powder), has a band gap greater than 5.0 eV and the metal oxide is selected from calcium oxide (CaO), magnesium oxide (MgO), strontium oxide (SrO), aluminum oxide $Al_2O_3$, and combinations thereof.

In an embodiment, the metal oxide is in the form of particles (powder) and has a band gap greater than 6.0 eV. In a further embodiment, the metal oxide is selected from calcium oxide (CaO), magnesium oxide (MgO), and combinations thereof. In yet a further embodiment, the metal oxide is calcium oxide (CaO).

In an embodiment, the metal oxide is calcium oxide (6.9 eV), in the form of particles (powder), the calcium oxide powder having a D50 particle size from 100 nm, or 125 nm, or 150 nm to 250 nm, or 500 nm, or 1000 nm, or 3000 nm. In a further embodiment, the calcium oxide powder has a D50 from 100 nm to 3000 nm, or from 125 nm to 1000 nm, or from 150 nm to 500 nm, or from 175 nm to 250 nm, or from 125 to 160 nm, or from 150 to 160 nm.

In an embodiment, the metal oxide is hygroscopic and includes surface bound moisture. In a further embodiment, the metal oxide is $CaO.H_2O$.

B(ii) Acid Copolymer

The odor suppressant includes an acid copolymer along with the metal oxide. The term "acid copolymer," (or "AC") as used herein, is a copolymer containing (i) ethylene monomer and (ii) a carboxylic acid comonomer or ester derivative thereof (hereafter referred to as "acid comonomer"). The acid copolymer contains the acid comonomer in an amount from 1 wt %, or 5 wt %, or 10 wt %, or 15 wt % to 20 wt %, or 25 wt %, or 30 wt % and a reciprocal wt % amount of ethylene monomer. It is understood that the acid copolymer contains greater than 50 wt %, or greater than 60 wt % ethylene monomer. In a further embodiment, the acid copolymer includes from 1 wt % to 30 wt % acid comonomer (and reciprocal amount ethylene), or from 5 wt % to 30 wt % acid comonomer (and reciprocal amount ethylene), or from 10 wt % to 25 wt % acid comomomer (with reciprocal amount of ethylene), or from 15 wt % to 20 wt % acid comonomer (and reciprocal amount ethylene), or from 5 wt % to 10 wt % acid comonomer (with reciprocal amount ethylene).

In an embodiment, the acid comonomer is an acrylate-based moiety. Nonlimiting examples of suitable acid copolymers wherein the acid comonomer is an acrylate-based moiety include ethylene ethyl acrylate copolymer (EEA), ethylene butyl acrylate copolymer (EBA), ethylene acrylic acid copolymer (EAA), ethylene/(meth)acrylic acid copolymer (EMA), and combinations thereof.

In an embodiment, the acid copolymer is an ethylene/acrylic acid copolymer having from 5 wt % to 30 wt % acrylic acid comonomer. Nonlimiting examples of suitable acid copolymers include Nucrel® polymers, available from E. I. du Pont de Nemours and Company (Wilmington, Del.).

In an embodiment, the odor suppressant is a pre-blend of the metal oxide powder dispersed in the acid copolymer. Mechanical blending and/or melt blending can be used to homogeneously disperse the metal oxide particles throughout the acid copolymer. The pre-blend that is the odor suppressant is subsequently added to the olefin-based polymer (A).

C. Composition

In an embodiment, the present composition includes (A) from 85 wt % to 99.85 wt % of the olefin-based polymer and (B) from 15 wt %, or 13 wt %, or 11 wt %, or 10 wt %, or 9 wt %, or 7 wt %, or 5 wt % to 2 wt %, or 1 wt %, or 0.6 wt %, or 0.5 wt %, or 0.3 wt %, or 0.2 wt %, or 0.15 wt % of the odor suppressant. The odor suppressant is mixed, or otherwise is blended, into the olefin-based polymer matrix. The odor suppressant contains (i) from 0.05 wt %, or 0.1 wt %, or 0.15 wt %, or 0.2 wt %, or 0.25 wt %, or 0.3 wt %, or, 0.4 wt %, or 0.5 wt %, or 0.7 wt %, or 0.9 wt % to 1.0 wt %, or 1.5 wt %, or 2 wt % of particles of the metal oxide (with band gap greater than 5.0 eV); and (ii) from 0.1 wt %, or 0.5 wt %, or 1.0 wt %, or 3 wt %, or 4 wt. %, or 5 wt %, or 7 wt %, or 9 wt % to 10 wt %, or 11 wt %, or 13 wt % of the acid copolymer. Weight percents are based on total weight of the composition. The ratio of metal oxide to acid copolymer is from 1:20, or 1:15, or 1:10, or 1:8, or 1:6 to 1:4, or 1:2, or 1:1. The composition exhibits at least a 5% reduction in at least one volatile hetero-carbonyl species compared to the olefin-based polymer without the odor suppressant (i.e., the olefin-based polymer (A) alone).

The reduction in volatile hetero-carbonyl species is a quantitative comparison of (i) the amount of a pre-determined volatile hetero-carbonyl species present in the neat olefin-based polymer (i.e., the olefin-based polymer (A) without any odor suppressant) to (ii) the amount of the pre-determined volatile hetero-carbonyl species in the present composition composed of (A) the olefin-based polymer and (B) the odor suppressant. The reduction in volatile hetero-carbonyl species is measured by normalized gas chromatography as previously disclosed herein.

A "volatile hetero-carbonyl species," as used herein, is a hydrocarbon compound having from 1 carbon atom to 16 carbon atoms (i) and contains at least one heteroatom selected from S, O, N, and/or P, (ii) and has a molecular weight from 30 Daltons to 250 Daltons, (iii) and has a vapor pressure greater than 0.01 millimeters mercury (mm Hg) at standard temperature and pressure, or "STP." In an embodiment, the volatile hetero-carbonyl species has a C—O bond and/or a C═O bond. Nonlimiting examples of volatile hetero-carbonyl species include volatile $C_1$-$C_{16}$ aldehydes, volatile $C_1$-$C_{16}$ ketones, volatile $C_1$-$C_{16}$ carboxylic acids, volatile $C_1$-$C_{16}$ esters, volatile $C_1$-$C_{16}$ alcohols, volatile $C_1$-$C_{16}$ ethers and combinations thereof.

Nonlimiting examples of volatile $C_1$-$C_{16}$ aldehydes include formaldehyde, acetalaldehyde, propanal, hexanal, furfural, heptanal, benzaldehyde, octanal, nonanal, decanal, undecanal, and combinations thereof.

Nonlimiting examples of volatile $C_3$-$C_{16}$ ketones include 2-pentanone, 2-hexanone, 2-octanone, 2-nonanone, 2-decanone, 2-acetophenone, 2-undecanone, and combinations thereof.

Nonlimiting examples of volatile $C_1$-$C_{16}$ carboxylic acids include hexanoic acid, butyric acid, heptanoic acid, octanoic acid, benzoic acid, nonanoic acid, decanoic acid, and combinations thereof.

Nonlimiting examples of volatile $C_1$-$C_{16}$ alcohols include methanol, ethanol, propanol, 2-methyl butanol, and combinations thereof.

Nonlimiting examples of volatile $C_1$-$C_{16}$ ethers include tetrahydrofuran (THF) and alkyl derivatives thereof.

In an embodiment, the composition includes (A) an olefin-based polymer that is an ethylene-based polymer. The ethylene-based polymer contains an amount of at least one volatile hetero-carbonyl species. The composition includes (B) from 0.55 wt % to 5 wt % of the odor suppressant based on total weight of the composition. The odor suppressant includes (Bi) from 0.05 wt % to 1 wt % of a metal oxide having a band gap greater than 5.0 electron volts (eV) that is particles of CaO, (Bii) from 0.5 wt % to 4 wt % based on total weight of the composition of an acid copolymer; and the ratio of metal oxide to acid copolymer is from 1:4 to 1:1. The composition exhibits at least a 5% reduction in at least one volatile hetero-carbonyl species compared to the olefin-based polymer (A) without the odor suppressant as measured by normalized gas chromatography.

In an embodiment, the composition includes (A) from 97 wt % to 98.9 wt % of an olefin-based polymer that is an ethylene-based polymer. The ethylene-based polymer contains an amount of at least one volatile hetero-carbonyl species. The composition includes from 3 wt %, or 2.8 wt % to 1.1 wt % of the odor suppressant wherein the odor suppressant contains (Bi) metal oxide that is particles of CaO in an amount from 0.01 wt %, or 0.05 wt %, or 0.07 wt % to 0.5 wt %, or 0.7 wt %, or 0.9 wt % and (Bii) acid copolymer that is an ethylene/acrylic acid copolymer in an amount from 0.1, or 0.2, or 0.5, or 0.7, or 0.9 to 1.0, or 1.3, or 1.5, or 1.7, or 1.9 and the ratio of metal oxide to acid copolymer is from 1:10, or 1:8, or 1:6 to 1:4, or 1:2, or 1:1. Weight percents are based on the total weight of the composition. The composition exhibits at least a 20% reduction in at least one volatile hetero-carbonyl species compared to the olefin-based polymer (A) without the odor suppressant. The reduction in volatile hetero-carbonyl species is measured by normalized gas chromatography.

In an embodiment, the composition includes (A) from 99.8 wt % to 99.85 wt % of an olefin-based polymer that is an ethylene-based polymer. The ethylene-based polymer contains an amount of at least one volatile hetero-carbonyl species. The composition includes from 0.2 wt % to 0.15 wt % of the odor suppressant wherein the odor suppressant contains (Bi) metal oxide that is particles of CaO in an amount from 0.05 wt %, or 0.06 wt % to 0.08 wt %, or 0.1 wt %, and (Bii) acid copolymer that is an ethylene/acrylic acid copolymer in an amount from 0.1 wt %, or 0.12 wt % to 0.15 wt %, or 0.18 wt % and the ratio of metal oxide to acid copolymer is from 1:4 to 1:2 and is hereafter referred to as composition1. Weight percents are based on total weight of the composition. Composition1 exhibits from 20% to 25% reduction in at least one volatile hetero-carbonyl species compared to the olefin-based polymer (A) without the odor suppressant. The reduction in volatile hetero-carbonyl species is measured by normalized gas chromatography.

In an embodiment, composition1 includes (A) 98.92 wt % ethylene-based polymer and 0.18 wt % of the odor suppressant. The odor suppressant contains (Bi) metal oxide that is particles of CaO in an amount of 0.06 wt % and (Bii) acid copolymer that is an ethylene/acrylic acid copolymer in an amount of 0.12 wt %, and the ratio of metal oxide to acid copolymer is 1:2. Composition1 exhibits a 20% reduction in propanal compared to the amount of propanal present in the olefin-based polymer (A) alone over an exposure period of 20 hours. The percent reduction in propanal is measured by normalized gas chromatography.

In an embodiment, the composition includes (A) from 98.5 wt % to 99.0 wt % of an olefin-based polymer that is an ethylene-based polymer. The ethylene-based polymer contains an amount of at least one volatile hetero-carbonyl species. The composition includes from 1.5 wt %, or 1.3 wt % to 1.1 wt %, or 1.0 wt % of the odor suppressant wherein the odor suppressant contains (Bi) metal oxide that is particles of CaO in an amount from 0.05 wt %, or 0.08 wt % to 0.1 wt %, or 0.13 wt %, or 0.15 wt % and (Bii) acid copolymer that is an ethylene/acrylic acid copolymer in an amount from 1.0 wt %, or 1.1 wt % to 1.2 wt %, or 1.3 wt % and the ratio of metal oxide to acid copolymer is from 1:15, or 1:12 to 1:10, or 1:8 and is hereafter referred to as composition2. Weight percents are based on total weight of the composition. Composition2 exhibits from 25% to 30% reduction in at least one volatile hetero-carbonyl species compared to the olefin-based polymer (A) without the odor suppressant. The reduction in volatile hetero-carbonyl species is measured by normalized gas chromatography.

In an embodiment, composition2 includes (A) 98.9 wt % ethylene-based polymer and 1.1 wt % of the odor suppressant. The ethylene-based polymer contains an amount of at least one volatile hetero-carbonyl species. The odor suppressant contains (Bi) metal oxide that is particles of CaO in an amount of 0.1 wt % and (Bii) acid copolymer that is an ethylene/acrylic acid copolymer in an amount of 1.0 wt %, and the ratio of metal oxide to acid copolymer is 1:10. Composition2 exhibits a 28% reduction in propanal compared to the amount of propanal present in the olefin-based polymer (A) alone over an exposure period of 20 hours. The percent reduction in propanal is measured by normalized gas chromatography.

In an embodiment, the composition includes (A) from 94 wt % to 96 wt % of an olefin-based polymer that is an ethylene-based polymer. The composition includes from 6 wt % to 4 wt % of the odor suppressant wherein the odor suppressant contains (Bi) metal oxide that is particles of CaO in an amount from 0.8 wt % to 1.0 wt %, or 1.2 wt % and (Bii) acid copolymer that is an ethylene/acrylic acid copolymer in an amount from 3.0 wt % to 5.0 wt % and the ratio of metal oxide to acid copolymer is from 1:3 to 1:5 and is hereafter referred to as composition3. Weight percents are based on total weight of the composition. Composition3 exhibits from 28% to 32% reduction in at least one volatile hetero-carbonyl species compared to the olefin-based polymer (A) without the odor suppressant. The reduction in volatile hetero-carbonyl species is measured by normalized gas chromatography.

In an embodiment, composition3 includes (A) 95 wt % ethylene-based polymer and 5 wt % of the odor suppressant. The odor suppressant contains (Bi) metal oxide that is particles of CaO in an amount of 1.0 wt % and (Bii) acid copolymer that is an ethylene/acrylic acid copolymer in an amount of 4.0 wt %, and the ratio of metal oxide to acid copolymer is 1:4. Composition3 exhibits a 30% reduction in propanal compared to the amount of propanal present in the olefin-based polymer (A) alone over an exposure period of 20 hours. The percent reduction in propanal is measured by normalized gas chromatography.

D. Applications

The present composition may be used in any application wherein a polymeric material, and an olefin-based polymer in particular, is exposed to volatile hetero-carbonyl species. Nonlimiting examples of suitable applications for the present composition include trash liners, fabrics used in clothing, automotive interiors, and food packaging such as caps & closures, bottles, and wraps.

Surprisingly, the present composition (i.e., composition1 and/or composition2 and/or composition3) exhibits the same, or better, odor suppression capability without compromising processability and without compromising film properties. Applicant discovered the metal oxide with band gap of greater than 5.0 eV works synergistically with the acid copolymer to improve odor suppression with less total metal oxide (and less CaO in particular) compared to polymer matrix systems containing metal oxide only. The ability of acid copolymer to synergistically improve odor suppression when combined with metal oxide with band gap of greater than 5.0 eV (and CaO in particular) is unexpected.

The present disclosure provides a process. In an embodiment, the process includes providing an olefin-based polymer (A). The olefin-based polymer (A) has an amount of at least one volatile hetero-carbonyl species. The process includes adding to the olefin-based polymer (A) from 0.15 wt % to 15 wt % of an odor suppressant (B). The odor suppressant (B) includes (Bi) from 0.05 wt % to 2 wt % of a metal oxide having a band gap greater than 5.0 electron volts (eV), and (Bii) from 0.1 wt % to 13 wt % of an acid copolymer, the ratio of metal oxide to acid copolymer is from 1:20 to 1:1. The process includes neutralizing, with the odor suppressant, at least some of volatile hetero-carbonyl species in olefin-based polymer (A) to form an odor-reduced composition. Weight percents are based on total weight of the odor-reduced composition.

In an embodiment, the process includes forming an odor-reduced composition exhibiting at least a 20% reduction in the amount of a volatile hetero-carbonyl species compared to the olefin-based polymer (A), as measured by normalized gas chromatography.

In an embodiment, the process includes dispersing, before the adding, particles of the metal oxide in the acid copolymer to form an odor suppressant pre-blend. The process includes adding the odor suppressant pre-blend to the olefin-based polymer (A) to form the odor-reduced composition.

By way of example, and not limitation, some embodiments of the present disclosure will now be described in detail in the following Examples.

Examples

Materials used in the examples are provided in Table 1 below.

loading (CaSt-600 ppm\Igrafos 168-500 ppm\Irganox 1010-500 ppm). Dry blending included addition of powdered additives to powder resin into a large bag and shaking the bag repeatedly. The additized resin was then split into aliquots. Each aliquot was then treated with powdered AC, and CaO in the same fashion as the antioxidants etc. Aliquots and control samples were stored in glass jars with PTFE-lined caps until they were introduced into the pelletizing extruder.

Samples were pelletized by feeding each powder aliquot into a Brabender Micro16 twin screw extruder. The melt temperature was set to 190° C. and the feed hopper is blanketed with nitrogen to prevent oxidative degradation of the extruded polymer. The molten extrudate was routed through chilled cooling water, and into an automated strand-cutting apparatus. The resulting pellets were collected as soon as practical into glass jars with PTFE-lined caps to avoid any possible off-gassing.

2. Odor Suppression—Reduction in Volatile Hetero-Carbonyl Species

Samples were prepared by adding 2 grams of sample pellets to separate headspace vials. A 0.5 mL, 1700 ppmv sample of propanal was added separately to each headspace vial. Samples were sealed for 20 hrs at room temperature, and shaken for 4 hours. Headspace gas was withdrawn for testing as described above.

Comparative sample (CS1) was prepared. CS1 is a control sample with LDPE722 (LDPE) and no odor suppressant.

IE1-IE3 are inventive examples of the present composition composed of LDPE722 and odor suppressant composed of varying amounts CaO and acid copolymer (AC).

TABLE 1

| Material/Description | Material Abbreviation | Properties | Source |
|---|---|---|---|
| DMDA-1250 (HDPE) | PE1 | HDPE, ethylene/octene copolymer; density = 0.955 g/cc; MI 1.5 g/10 min, Tm = 130° C. | The Dow Chemical Company |
| LDPE722 (LDPE) | PE2 | LDPE, broad molecular weight distribution homopolymer, density = 0.918 g/cc; MI 8.0 g/10 min, Tm = 107° C. | The Dow Chemical Company |
| Calcium Oxide (CaO) | CaO | density = 3.3 g/cc; Loss on Ignition 1000° C. after 2 hours ≤ 10% | Sigma-Aldrich Chemical Company |
| Nucrel ® 3990 (acid copolymer) | AC | ethylene/acrylic acid copolymer; 9.5 wt % acrylic acid comonomer; density = 0.940 g/cc; Tm = 78° C.; MI = 10 g/10 min | DuPont |
| Surlyn ® 9150 (ionomer) | Ionomer | Zn salt of ethylene/methacrylic acid copolymer; density = 0.970 g/cc; Tm = 82° C.; MI = 4.5 g/10 min | DuPont |
| Propanal (volatile carbonyl containing species) | Volatile $C_3$ aldehyde | Molecular weight 58.08 g/mol (Daltons) Density 0.866 g/cc Boiling point 49° C. at 760 mm Hg 235 mm Hg at STP | |

1. Sample Preparation

Individual additives were ground as needed to ensure similar particle size distributions between the polyolefin resin and the intended additives. The polyolefin material which was to be tested is dry blended with antioxidant The percent of propanal reduction (volatile hetero-carbonyl species) using CS1 as control and compared to respective IE1-IE3 is provided in Table 2 below.

Table 2. Headspace GC reductions in propanal upon exposure to compositions (all results normalized to control sample, CS1 using normalized gas chromotography)

TABLE 2

| Composition | Wt %* Odor suppressant | CaO:AC ratio | % Propanal reduction compared to control |
|---|---|---|---|
| CS1 (control) | PE2 | n/a | n/a | 0 |
| IE1 | PE2 + 0.06 wt % CaO + 0.12 wt % AC | 0.18 | 1:2 | 20 |
| IE2 | PE2 + 0.1 wt % CaO + 1 wt % AC | 1.1 | 1:10 | 28 |
| IE3 | PE2 + 1 wt % CaO + 4 wt % AC | 5 | 1:4 | 30 |

*wt % based on total weight composition

Normalized gas chromatography is determined using Equation (1) as follows.

$$(GC_{(propanal\ at\ 20\ hrs, CE1)} - GC_{(propanal\ at\ 20\ hrs, IEx)})/GC_{(propanal\ at\ 20\ hrs, CE1)} * 100;$$

where $GC_{(propanal\ at\ 20\ hrs,\ CE1)}$ is the area under the curve associated with propanal and t is a time point of 20 hrs exposure to an initial concentration of 38 ppmv for CS1. The term "IEx" indicates IE1, IE2, and IE3.

$$GC_{(propanal\ at\ 20\ hrs, CE1)} - GC_{(propanal\ at\ 20\ hrs, IE1)})/GC_{(propanal\ at\ 20\ hrs, CE1)} * 100 = (980088 - 800827)/(980088) * 100 = 18$$

Data presented in Table 2 are the average of two samples for each sample. The greater the % odor reduction value, the greater the odor suppression.

Odor suppression capability for CaO is known to be linear whereby the more CaO added to a polyolefin, the greater is the odor suppression. However, high loadings (greater than 5 wt %) of CaO are unfavorable because metal oxide, and CaO in particular, can interfere with the melt processing of polyolefin.

In Table 2, IE1 (odor suppressant at 0.18 wt %, 0.06 wt % CaO and 0.12 wt % AC, CaO:AC ratio 1:2) demonstrates that only at small load (less than 0.2 wt %, in IE1 specifically 0.06 wt %) of CaO in conjunction with a 1:2 CaO:AC ratio exhibits a significant amount (20% reduction) of odor suppression after 20 hours.

IE2 (odor suppressant at 1.1 wt %, 0.1 wt % CaO and 1.0 wt % CaO:AC ratio 1:10) demonstrates further that at small load (less than 0.2 wt % CaO and in IE2 specifically 0.1 wt %) of CaO odor suppressant in conjunction with a 1:10 CaO:AC ratio exhibits a significant amount (28% reduction) of odor suppression after 20 hours.

IE3 (odor suppressant at 5 wt %, 1.0 wt % CaO and 4.0 wt % CaO:AC ratio 1:4) exhibits 30% odor reduction after 20 hours. Compared to IE2, IE3 increases CaO concentration 10× (CaO in IE2 is 0.1 wt %, CaO in IE3 is 1 wt %), and IE3 increases AC concentration 4× (IE2 AC is 1 wt %, IE3 AC is 4 wt %), for in an increase in odor suppression of 7%.

IE1-IE3 show that 0.15-15 wt % CaO/AC odor suppressant (and in particular 0.18-5.0 wt % odor suppressant) with (i) 0.05-2 wt % CaO, (ii) 0.5-13 wt % AC, and (iii) CaO:AC ratio from 1:20 to 1:1 significantly reduces carbonyl-containing species (i.e., at least 20% reduction in carbonyl-containing species compared to the same polyolefin containing no CaO/AC odor suppressant).

3. Sensory Panel

Ten grams of resin floated in 900 mL of Nestle Purified drinking water in a glass jar secured with a PTFE lined lid. The samples were stored at 40° C. for twenty hours. The resin was then removed and the water was poured into a large glass container to make a homogenous mix. For the evaluation, forty milliliters was poured into seven ounce polystyrene cups and served at room temperature.

TABLE 3

| Taste Preparation | |
|---|---|
| Test medium | Nestle Pure Life purified water (900 ml) |
| Sample | Resin (10 g) |
| Contact time | 20 hours |
| Contact temperature | 40° C. |
| Serving temperature | Room temperature |
| Serving amount | 40 mL in 7 oz cup |

Figure 1:
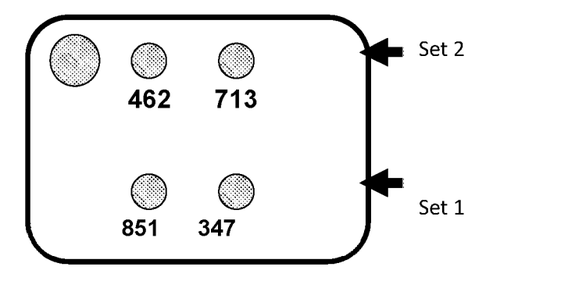
FIG. 1 is a schematic representation of a tray of water samples identified with random three digit codes for presentation to sensory panelists in accordance with an embodiment of the present disclosure.

Test Method Panelists smelled the back of their hand and used water between taste samples to reduce fatigue and carry over affect. Random three digit codes were used as blind sample identification. A balanced block design was used to ensure all samples were served equally often and in all positions. The replicate set of samples provided a measure of test reproducibility. FIG. 1 shows a representation of a tray with water samples provided to the panelists, the tray using random three digit codes to identify the water samples.

TABLE 4

| | |
|---|---|
| Number of panelists | 24 |
| Sensory questionnaire | Paired Comparison, Hedonic Acceptability, and Descriptive Analysis |
| Sample codes | Random 3 digit |
| Test design | Random order of presentation |
| Fatigue minimization | Nestle water |
| Replicate served | Yes |

The procedure of the taste and odor evaluations by the human sensory panel follow protocols suggested by ASTM and ISO and incorporates the scientific method and good statistical practices.

TABLE 5

| Taste and odor panel results | | | | |
|---|---|---|---|---|
| | Composition | Odor Ranking Intensity* | Taste of water: Paired comparison: Set 1 (%)[a] | Taste of water: Paired comparison: Set 2 (%)[a] |
| IE4 | PE1 + 0.1 wt % CaO + 1 wt % AC | 1.5 | 83 | 79 |
| CS2 | PE1 | 2.1 | 17 | 21 |
| CS3 | PE1 + 0.1 wt % CaO | 2.3 | NT | NT |

NT = not tested, i.e. not a choice in the pair comparison
*Odor intensity ranking is rated from 1 to 5, with 1 being "least intense" and 5 being "most intense"
[a]Higher percentage scores means is preferred, means that more participants chose that sample as the better sample It is specifically intended that the present disclosure not be limited to the embodiments and illustrations contained herein, but include modified forms of those embodiments including portions of the embodiments and combinations of elements of different embodiments as come within the scope of the following claims.

The invention claimed is:
1. A composition comprising:
(A) an ethylene-based polymer consisting of (i) ethylene and (ii) an optional $C_3$-$C_{20}$ α-olefin comonomer;

(B) from 0.15 wt % to 15 wt % of an odor suppressant based on total weight of the composition, the odor suppressant consisting of
(Bi) from 0.05 wt % to 2 wt % based on the total weight of the composition of a metal oxide having a band gap greater than 5.0 electron volts (eV); and
(Bii) from 0.1 wt % to 13 wt % based on the total weight of the composition of an acid copolymer composed of (i) ethylene monomer and (ii) a carboxylic acid comonomer or ester derivative thereof; and
(C) optional antioxidant;
wherein (A), (Bi), (Bii), and (C) amount to 100 wt. % of the composition; and
wherein the ratio of metal oxide to acid copolymer is from 1:20 to 1:1.

2. The composition of claim 1 wherein the composition exhibits at least a 20% reduction in a volatile hetero-carbonyl species compared to the ethylene-based polymer without the odor suppressant, as measured by normalized gas chromatography.

3. The composition of claim 1 wherein the metal oxide is selected from the group consisting of calcium oxide and magnesium oxide.

4. The composition of claim 1 wherein the acid copolymer is selected from the group consisting of ethylene ethyl acrylate copolymer copolymer, ethylene butyl acrylate copolymer, ethylene acrylic acid copolymer, ethylene/(meth)acrylic acid copolymer, and combinations thereof.

5. The composition of claim 1 wherein the odor suppressant is a blend of the metal oxide particles dispersed in the acid copolymer.

6. The composition of claim 1 wherein the composition comprises
the ethylene-based polymer;
from 0.55 wt % to 5 wt % of the odor suppressant based on total weight of the composition, the odor suppressant comprising
(i) from 0.05 wt % to 1 wt % based on total weight of the composition of the metal oxide having a band gap greater than 5.0 electron volts (eV); and
(ii) from 0.5 wt % to 4 wt % based on total weight of the composition of the acid copolymer; and
the ratio of metal oxide to acid copolymer is from 1:4 to 1:1.

7. The composition of claim 1 wherein the metal oxide is particles of calcium oxide.

8. The composition of claim 1 wherein the acid copolymer is ethylene acrylic acid.

9. The composition of claim 1 wherein the ethylene-based polymer has
(i) a density from 0.910 g/cc to 0.920 g/cc;
(ii) a melt temperature (Tm) from 105° C. to 110° C.; and
(iii) a melt index from 5.0 g/10 min to 10.0 g/10 min.

10. The composition of claim 8 wherein the ethylene acrylic acid has from 5 wt % to 30 wt % acrylic acid comonomer.

11. The composition of claim 7 wherein the particles of calcium oxide have a D50 particle size from 100 nm to 3000 nm.

12. A process comprising:
(1) providing a composition, the composition comprising
(A) an ethylene-based polymer, the ethylene-based polymer consisting of (i) ethylene and (ii) an optional $C_3$-$C_{20}$ α-olefin comonomer and having an amount of at least one volatile carbonyl-containing species;
(B) from 0.15 wt % to 15 wt %, based on total weight of the composition, of an odor suppressant consisting of
(Bi) from 0.05 wt % to 2 wt %, based on total weight of the composition, of a metal oxide having a band gap greater than 5.0 electron volts (eV); and
(Bii) from 0.1 wt % to 13 wt %, based on total weight of the composition, of an acid copolymer composed of (i) ethylene monomer and (ii) a carboxylic acid comonomer or ester derivative thereof, and
(C) optional antioxidant,
wherein (A), (B), (Bi), (Bii), and (C) amount to 100 wt% of the composition; and
wherein the ratio of metal oxide to acid copolymer is from 1:20 to 1:1; and
(2) neutralizing, with the odor suppressant, at least some of the volatile hetero-carbonyl species to form an odor-reduced composition.

13. The process of claim 12 comprising
forming an odor-reduced composition exhibiting at least a 20% reduction in the amount of a volatile hetero-carbonyl species compared to the ethylene-based polymer without the odor suppressant, as measured by normalized gas chromatography.

14. The process of claim 12 comprising dispersing, before the adding, particles of the metal oxide in the acid copolymer to form an odor suppressant pre-blend;
adding the odor suppressant pre-blend to the ethylene-based polymer; and
forming the odor-reduced composition.

* * * * *